Jan. 10, 1928.
E. PIQUEREZ
1,655,436
LUBRICANT COMPRESSOR
Filed April 15, 1925
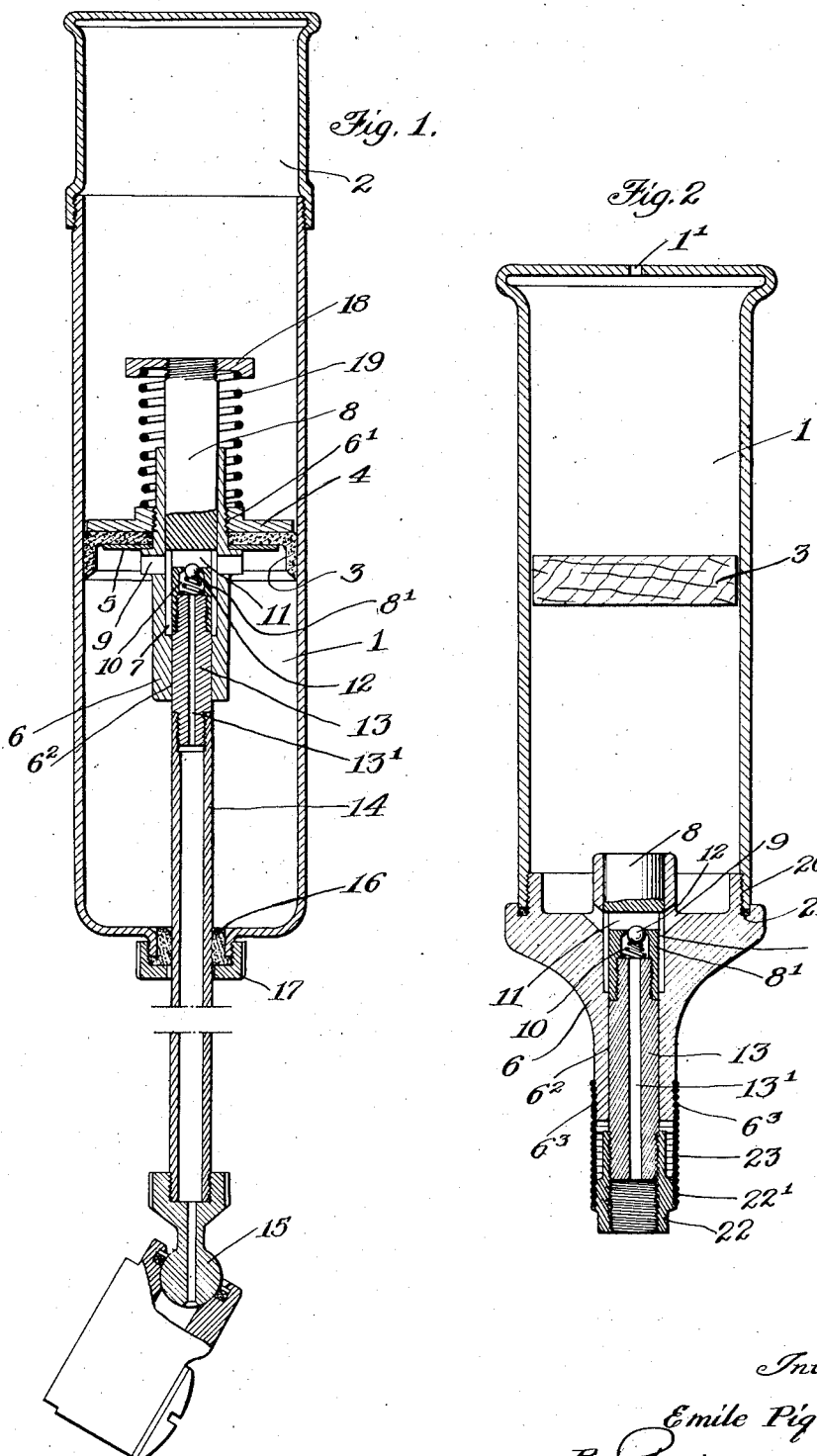
Inventor
Emile Piquerez.
By Pierce & Scott
Attys.

Patented Jan. 10, 1928.

1,655,436

UNITED STATES PATENT OFFICE.

EMILE PIQUEREZ, OF PARIS, FRANCE, ASSIGNOR TO THE BASSICK MANUFACTURING COMPANY, OF CHICAGO, ILLINOIS, A CORPORATION OF DELAWARE.

LUBRICANT COMPRESSOR.

Application filed April 15, 1925, Serial No. 23,282, and in France September 26, 1924.

This invention relates to lubricant compressors, and more specifically to an improved compressor in which compression may be accomplished manually by displacement of the lubricant reservoir itself. In the embodiment disclosed, compression is obtained by pulling on the reservoir, and admission by automatic return of the reservoir under the action of a spring stretched or compressed during the preceding stroke.

The compression means is co-axial with the reservoir and may be positioned inside or outside the same.

In the accompanying drawings, which illustrate two embodiments of compressors according to the invention:

Fig. 1 is a longitudinal section of one embodiment with the compression means inside the reservoir.

Fig. 2 is a longitudinal section of an alternative construction with the compression means outside the reservoir.

In the embodiment of the invention selected for illustration in Fig. 1, the apparatus comprises a lubricant reservoir 1, closed at its bottom by a cap 2, which may be of drawn sheet metal, the same as the reservoir, the coupling being made so that the cylindrical interior cavities of the same diameter will be prolongations of each other. Piston 3 inside the reservoir comprises a cup leather held between the metallic clamping plates 4 and 5. The ring 5 rests on a shoulder on the body 6 of the small compression cylinder, which has a threaded elongation 6' threaded into the center of the plate 4. Body 6 has a bore 7 throughout part of its length of the same diameter as the full size piston 8, which piston is provided with a cylindrical extension 8' of smaller diameter slidable in the bore 6² at the bottom of body 6. The annular space between the inner wall of bore 7 and the rod 8' communicates with reservoir 1 by lateral ports 9, of which two are illustrated, and with the exit chamber 10 provided in axial elongation 8' of the piston by the transverse conduit 11.

Check valve means, such as ball valve 12, controls the passage of lubricant from conduit 11 to chamber 10, the spring for the ball bearing on the end of a rod 13, continuing the extension 8', in which it may be fastened by screw threads, said rod being also a good sliding fi* in the bore 6². Rod 13 contains a central conduit 13', discharging into the rigid tube 14 carried at the end of rod 13, and conveying the lubricant to the connecting fitting through a universal joint 15. Tube 14 passes through a shouldered sealing sleeve 16 positioned in the tubular portion of the bottom of reservoir 1 and clamped in place by a threaded cap 17.

On the remote end of the full size piston 8 there is fastened, as by threading it in place, a cap 18 against which abuts the upper end of a spring 19 bearing at its other end on the boss of the plate 4.

The operation is as follows:

The parts being in the position shown in Fig. 1, lubricant fills the space below piston 3 in the reservoir and the annular chamber 7. The operator may hold tube 14 with one hand and with the other pull reservoir 1 towards himself, sliding it on the tube. The lubricant is thus compressed between the reservoir bottom and the piston 3 and builds up the same pressure in the annular space 7. As soon as this pressure is equal to the tension of spring 19, the latter will yield, and as the movement continues cylinder 6 will slide on piston 8 to cover the ports 9 so that the lubricant, compressed in the small annular space 7 of decreasing volume, will finally pass out into chamber 10 when its pressure is sufficient to push back the ball 12. The operator can now let the reservoir come forward again under the action of spring 18. The empty space 7 developed by the displacement of the cylinder body 6 will fill itself with lubricant when ports 9 are uncovered, and the cycle is complete.

In the embodiment of Fig. 2, the apparatus comprises a one-piece reservoir 1 with its bottom apertured to form an air vent 1' to let air come in to the upper face of the thick follower 3, preferably of wood, which can thus remain in contact with the body of lubricant. At its lower end the reservoir is threaded to engage the lip 20 of the body 6 of the compression cylinder, a tight joint being assured by a packing 21 positioned in a groove in body 6 for this purpose. As in the preceding embodiment, this body has the upper bore 7, of the same diameter as piston 8, communicating with the reservoir by oblique ports 9. Piston 8 is provided with the extension 8' sliding in the bore 6² at the bottom of the cylinder, and having the transverse conduit 11 and chamber 10 with the ball valve 12. Rod 13, continuing extension 8', is threaded into a sleeve 22 for connection to a flexible distribution tube of a well known type, or any other suitable receiving means. Sleeve 22 has an outer tapered portion 22' on which are clamped the end coils of a spring 23, similarly attached at its upper end to a tapered portion 6³ machined at the end of body 6.

The operation is as follows:

The parts being in the position of Fig. 2, lubricant fills the annular space 7. On displacement of reservoir 1, spring 23 stretches, body 6 slides on the guide rod 13 and piston 8 to cover ports 9. On further movement, the lubricant is compressed in the annular space 7 and flows out through conduit 11, chamber 10 and passage 13'. The reservoir may then be allowed to return under the action of spring 23. As body 6 moves down, it creates a suction in space 7 which will fill with lubricant as soon as ports 9 are uncovered, and the cycle is complete.

Without further elaboration, the foregoing will so fully explain the gist of the invention, that others may, by applying current knowledge, readily adapt the same for use under various conditions of service without eliminating certain features which may properly be said to constitute the essential items of novelty involved, which items are intended to be defined and secured by the following claims.

I claim:

1. A lubricant compressor comprising a reservoir, a coupling, an extensible connection between the two, and pump means inside of the reservoir actuated by relative movement of the reservoir and coupling for compressing lubricant, said pump means comprising an annular piston in said reservoir, a small cylinder centrally located at the axis of said piston, a high pressure piston in said small cylinder, said small cylinder having inlet ports uncovered by said high pressure piston at one end of its stroke, said high pressure piston projecting beyond the end of said small cylinder, an enlargement on the end of said high pressure piston, and a compression spring abutting said enlargement and said small cylinder and resiliently holding them with the ports uncovered.

2. A lubricant compressor comprising a reservoir, a coupling, an extensible connection between the two, and pump means inside of the reservoir actuated by relative movement of the reservoir and coupling for compressing lubricant, said pump means comprising an annular piston in said reservoir, a small cylinder centrally located at the axis of said piston, a high pressure piston in said small cylinder, said small cylinder having inlet ports uncovered by said high pressure piston at one end of its stroke, said high pressure piston projecting beyond the end of said small cylinder, an enlargement on the end of said high pressure piston, and a spring engaging said enlargement and said small cylinder and resiliently holding them with the ports uncovered.

3. A lubricant compressor comprising a reservoir, a coupling, an extensible connection between the two, and pump means inside of the reservoir actuated by relative movement of the reservoir and coupling for compressing lubricant, said pump means comprising an annular piston in said reservoir, a small cylinder centrally located at the axis of said piston, a high pressure piston in said small cylinder, said small cylinder having inlet ports uncovered by said high pressure piston at one end of its stroke, said high pressure piston projecting beyond the end of said small cylinder, and a spring engaging said high pressure piston and said small cylinder and resiliently holding them with the ports uncovered.

4. A lubricant compressor comprising a reservoir, a coupling, an extensible connection between the two, and pump means inside of the reservoir actuated by relative movement of the reservoir and coupling for compressing lubricant, said pump means comprising an annular piston in said reservoir, a small cylinder centrally located at the axis of said piston, a high pressure piston in said small cylinder, said small cylinder having inlet ports uncovered by said high pressure piston at one end of its stroke.

5. A lubricant compressor comprising a reservoir, a coupling, an extensible connection between the two, and pump means inside of the reservoir actuated by relative movement of the reservoir and coupling for compressing lubricant, said pump means comprising an annular piston in said reservoir, a small cylinder centrally located at the axis of said piston, and a high pressure piston in said small cylinder.

6. A lubricant compressor comprising a reservoir, a coupling, an extensible connection between the two, and pump means inside of the reservoir actuated by relative movement of the reservoir and coupling for compressing lubricant, said pump means comprising an annular piston in said reservoir, a small cylinder centrally located at the axis of said piston, a high pressure piston in said small cylinder, a rigid connection between said high pressure piston and said coupling, and a resilient connection between said high pressure piston and its cylinder.

7. A lubricant compressor comprising a reservoir, a coupling, an extensible connection between the two, and pump means inside of the reservoir actuated by relative movement of the reservoir and coupling for compressing lubricant, said pump means comprising a piston in said reservoir, a small cylinder centrally located at the axis of said piston, a high pressure piston in said small cylinder, and transmission means, acting hydraulically through pressure in the material in said reservoir, for producing relative movement between said piston and cylinder.

8. A lubricant compressor comprising low pressure means including a cylinder element and a piston element, high pressure compressing means fed by said low pressure means, a discharge conduit for said high pressure compressing means, and connections for actuating both compressing means by exerting tension on said discharge conduit.

9. A lubricant compressor comprising a reservoir, a discharge conduit movable toward and away from said reservoir, low pressure and high pressure compressing means connected in series, and means for actuating both compressing means by moving said conduit away from said reservoir.

In witness whereof, I hereunto subscribe my name, this 23d day of March, 1925.

EMILE PIQUEREZ.